United States Patent [19]

Milonas et al.

[11] 3,850,563

[45] Nov. 26, 1974

[54] SYSTEM AND METHOD FOR CONFECTIONARY MOLDING

[76] Inventors: Timothy S. Milonas; Janet O. Milonas, both of 278 Dennis Dr., Daly City, Calif. 94015

[22] Filed: Mar. 16, 1973

[21] Appl. No.: 341,818

[52] U.S. Cl.................. 425/275, 425/93, 425/470
[51] Int. Cl............................................. B28b 7/34
[58] Field of Search .............. 425/275, 269, 93, 470

[56] References Cited
UNITED STATES PATENTS
1,537,669  5/1925  Griffith .......................... 425/470 X Primary Examiner—Roy Lake
Assistant Examiner—DeWalden W. Jones
Attorney, Agent, or Firm—Townsend and Townsend

[57] ABSTRACT

A system and method are provided for molding confectionary articles in the home. A hollow male mold of porous earthen material has a protrusion at one end to provide the molding surface. The mold has an internal heat sink in communication with the molding surface. The mold and heat sink are cooled prior to use so that when the mold is dipped in a molten confectionary bath, heat is conducted away from the molding surface. The temperature gradient provided thereby allows the formed confectionary article to be readily removed from the mold.

6 Claims, 2 Drawing Figures

PATENTED NOV 26 1974 3,850,563
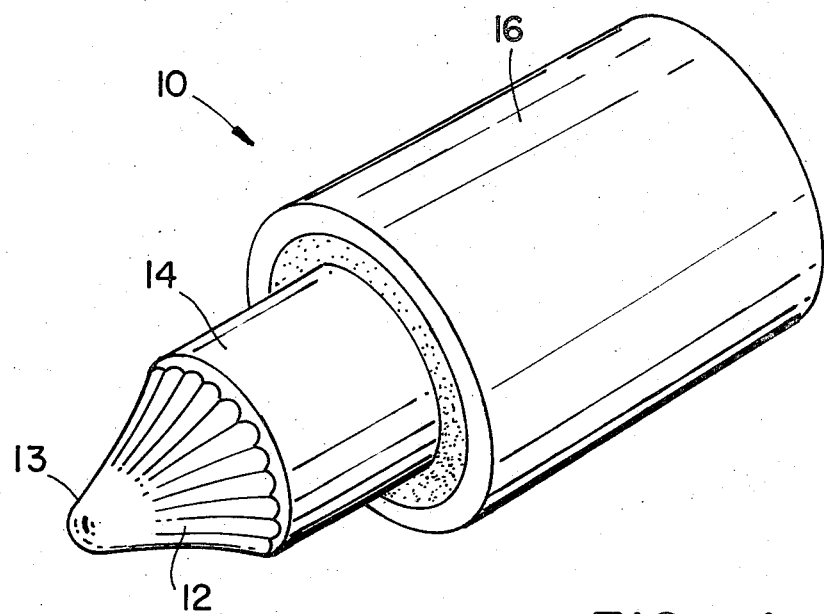
FIG_1
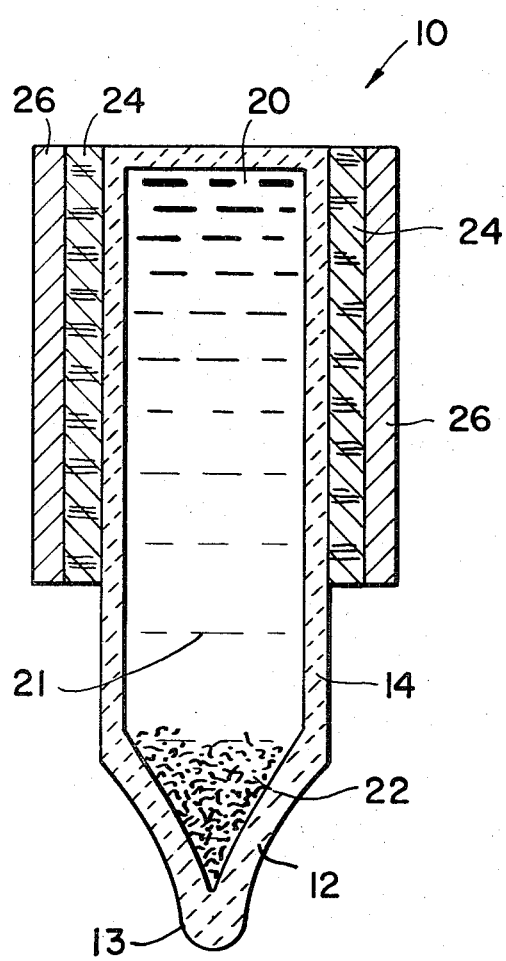
FIG_2

SYSTEM AND METHOD FOR CONFECTIONARY MOLDING

BACKGROUND OF THE INVENTION

This invention is primarily concerned with the molding of decorative configurations from a hot fluid confectionary bath. Chocolate is the most common confectionary material, but the invention applies to all such materials including confectionary wax. The type of article formation employed in the present invention incorporates a mold which is dipped into the chocolate bath and then removed from the bath carrying on its lower surface a layer of chocolate. When cooled the chocolate layer solidifies, and when removed from the mold, carries the mold configuration. The molded chocolate can be used as is, or attached to other articles to form particular decorations. Such decorations for example might include simulated flowers, petals, leaves and other articles which might be affixed to a confectionary standard or the like.

It is obvious that such a mold must have certain characteristics in order to be functional, namely, the mold must be able to cause the liquid chocolate to adhere to the outer face when in the fluid condition and to cool and solidify the fluid chocolate in a relatively short period of time. Lastly, and possibly the most important feature, is the necessity of the face of the mold being such that the solidified chocolate can be easily released or removed from the mold.

The applicant in the present invention has provided a mold of relatively simple construction which has all of the aforesaid features, and which, in addition, is economical and easy to use, particularly with the limitations afforded by home users.

SUMMARY OF THE INVENTION

The present invention incorporates a ceramic body of rather thick structure, formed of clay fired but not glazed, so that the mold maintains a high fluid transmissivity or porosity from the inside of the mold to the exterior. The interior portion of the mold is hollowed and filled with a fluid, the viscosity of which is such that in the fluid state the fluid will permeate the mold from the inside cavity to the outside surface. Because of the relatively thick walls of the mold, there is a high degree of thermal inertia which maintains a relatively constant temperature throughout the face of the mold. Because of the fluid connection from the inside fluid chamber, there is heat conductivity from the interior to the exterior and vice versa even though the clay itself is a known thermal insulator.

In this device the entire mold including the fluid contained therein is preconditioned at a temperature above the freezing temperature of the liquid inside the mold. Thus when using the mold in confectionary molding the chocolate will immediately adhere to and solidify because of the temperature preconditioning of the mold face. At the same time the fluid material contained within the mold takes the heat away from the outside surface so that a temperature gradient on the outside surface is maintained thus providing a quick release of the molded chocolate.

One of the principle advantages of the mold of the present invention lies in the fact that the mold itself is preferably formed of simple relatively thick walled earthen materials and the exterior is filled with similarly easy to obtain and inexpensive liquid coolant. The preconditioning can be accomplished in conventional freezing compartments of home refrigerators, thus bringing the usefulness of the invention within the facilities normally encountered in the average home.

As an added and important feature of the invention, the heat distribution within the interior of the mold is substantially enhanced by the inclusion of highly thermally conductive granules, i.e., copper filings and the like, so that the heat is more rapidly transmitted to more dramatically contribute to the effective operation of the present device.

The novel features which are believed to be characteristic of the invention both as to organization and method of operation, together with further objects and advantages thereof will be better understood from the following description considered in connection with the accompanying drawings in which a preferred embodiment of the invention is illustrated by way of example. It is to be expressly understood, however, that the drawings are for the purpose of illustration and description only and are not intended as a definition of the limits of the invention.

BRIEF DESCRIPTION OF THE DRAWINGS

FIG. 1 is a perspective view of the mold employed in the present invention.

FIG. 2 is a cross-sectional elevation view of the mold illustrated in FIG. 1.

DESCRIPTION OF THE PREFERRED EMBODIMENTS

The general features of the confectionary mold provided in the present invention are illustrated by way of reference to FIG. 1. The mold 10 is comprised basically of a convex protrusion 12 and an elongate portion 14. The convex protrusion 12 is formed of porous material, but the longitudinal portion 14 need not be. However, it has been found preferable to form the protrusion 12 and the longitudinal portion 14 out of a single piece of unglazed low temperature fired clay. The convex protrusion 12 has an exterior molding surface 13 formed to the desired interior shape of the article to be produced, and the molding surface served to form the interior of a concave confectionary article. The mold 10 is primarily adapted to be hand-held, and a sleeve 16 enclosing the elongate portion 14 is preferable provided to thermally insulate the mold.

The innovative features of the mold 10 are more fully illustrated in the sectional view of FIG. 2. The mold is hollow, and an internal cavity 20 is formed within the longitudinal section 14 and the convex protrusion 12. The portion of the cavity 20 interior the longitudinal section 14 is filled with a heat conductive fluid 21 to provide a heat sink. Porous heat conductive material 22 is packed in interior cavity 20 adjacent the molding surface 13. Copper shavings can be used as heat conductive material 22 since then can be easily obtained as undesirable scrap from a metal-working shop, and provide excellent heat conductivity. The fluid 21 permeates the heat conductive material 22 and also the porous walls 12 and 14 of the mold 10. The heat sink cavity 20 can be insulated from ambient conditions by means of an insulating layer 24 of cork or similar thermal insulative material. A rigid exterior plastic or metallic ring 26 is provided to protect the insulating layer 24.

The purpose of the structual elements illustrated in FIG. 2 is best explained by a description of the manner in which the mold 10 is used to form confectionary articles. THe mold is initially placed in a freezer to cool the fluid 21 in the interior cavity 20. To prevent freezing of the fluid, a saline solution, low viscosity silicone, or other type of fluid not subject to freezing in the freezing compartment of an average home refrigerator is used. Any fluid permeable to clay which has a freezing point lower than approximately −40°F is acceptable. The mold 10 is then removed from the freezer, and held by the handle 26, which together with insulating layer 24, inhibits heat transfer to the fluid 21. The molding surface 13 is then dipped into a vat of molten chocolate or other confectionary material. The mold 10 is then withdrawn from the vat of confectionary material with a layer of molten confectionary material adhering to the molding surface 13. The mold may be successively dipped to increase the thickness of the confectionary layer.

The fluid 21, which has permeated the porous clay protrusion 12 to the molding surface 13, conducts heat from the molten confectionary material away from the molding surface 13. This heat transfer is enhanced by the copper filings 22 adjacent the molding surface on the interior of the cavity 20 so that the heat is rapidly conducted to the fluid 21 in heat sink cavity 20. This heat transfer cools the molding surface 12 to a temperature substantially less than the temperature of the confectionary material to inhibit adherance of the confectionary material to the molding surface 13, and the confectionary article can be easily removed from the mold 10.

The above method can be used with a wide variety of confectionary materials. Although chocolate is the principle confectionary material, the above technique is also useful for forming icing, butter recipes, and has been found particularly useful in forming confectionary wax. During the formation of confectionary articles, particularly when confectionary wax is used, an exterior design can be imparted to the confectionary article by hand while it is adhering to the molding surface 12.

Hence, a confectionary article can be formed with the design imparted by the molding surface on the interior concave surface, and a design formed by hand, or by a secondary mold, on the exterior surface.

While a preferred embodiment of a mold containing the principles of the present invention has been illustrated, it is apparent that persons skilled in the art will perceive various means of altering that embodiment. However, modifications and adaptations may be made without departing from the spirit and scope of the present invention, as set forth in the following claims.

What is claimed as new is:

1. A molding apparatus for forming confectionary articles comprising:

a male mold constructed of porous earthen material, said mold comprising a convex protrusion having an exterior molding surface formed to the desired interior shape of the confectionary article and a longitudinal enclosure extending from the convex protrusion, said protrusion adapted to be dipped into a confectionary bath to form a confectionary layer thereon;

porous heat conductive material disposed within the mold adjacent the exterior molding surface thereof; and fluid contained within the longitudinal enclosure and permeating the porous heat conductive material and the porous earthen material, said fluid cooled so as to conduct heat away from the molding surface, said heat conduction enhanced by the porous heat conductive material.

2. A molding apparatus as disclosed in claim 1 and additionally comprising a thermoinsulative sleeve enclosing the longitudinal enclosure of the male mold.

3. A molding apparatus for forming confectionary articles comprising:

a male mold having a convex exterior molding surface;

means for conducting thermal energy from the molding surface; and a heat reservoir adapted to receive the thermal energy conducted from the molding surface.

4. A molding apparatus as recited in claim 3 wherein the male mold is constructed of unglazed, low temperature fired clay having a predetermined porosity, and wherein the means for conducting thermal energy from the molding surface comprises a fluid permeable to the clay.

5. A molding apparatus for forming confectionary articles comprising:

a male mold having an insulated chamber section and a protruding molding section, said protruding molding section constructed of porous material;

heat-retentive fluid contained within the insulated chamber section and permeating the protruding molding section; and metal filings disposed within the insulated chamber section adjacent the protruding molding section to enhance heat transfer from the molding section to the chamber section.

6. A molding apparatus for forming confectionary articles comprising:

a relatively thick walled molding shell constructed of unglazed, low temperature fired clay, said shell having a convex molding surface and an enclosed inner chamber; and fluid enclosed in the inner chamber and permeable to the fired clay, said fluid having a freezing point less than approximately −40°F.

* * * * *